United States Patent [19]
Wisor et al.

[11] Patent Number: 6,021,498
[45] Date of Patent: Feb. 1, 2000

[54] POWER MANAGEMENT UNIT INCLUDING A PROGRAMMABLE INDEX REGISTER FOR ACCESSING CONFIGURATION REGISTERS

[75] Inventors: Michael T. Wisor; Rita M. O'Brien, both of Austin, Tex.

[73] Assignee: Advanced Micro Devices, Inc., Sunnyvale, Calif.

[21] Appl. No.: 08/223,770

[22] Filed: Apr. 6, 1994

[51] Int. Cl.[7] ........................................ G06F 1/00
[52] U.S. Cl. .............................................. 713/300
[58] Field of Search .................................. 395/750, 700

[56] References Cited

U.S. PATENT DOCUMENTS

| 5,129,068 | 7/1992 | Watanabe et al. | 395/421.04 |
| 5,167,024 | 11/1992 | Smith et al. . | |
| 5,369,771 | 11/1994 | Gettel | 395/750 |
| 5,396,635 | 3/1995 | Fung | 395/800 |
| 5,404,543 | 4/1995 | Faucher et al. | 395/750 |

OTHER PUBLICATIONS

Frantz G.A., et al., "The Texas Instruments TMS320C25 Digital Signal Microcomputer", IEEE Micro,Dec. 6, 1986, vol. 6, No. 6, pp. 10–27.
Dubois Y.A. et al., "Portable Applications For PC–Compatible Chip Sets"; Wescon Technical Papers, Nov. 1, 1991, vol.35, pp. 471–476.

*Primary Examiner*—Ayaz R. Sheikh
*Assistant Examiner*—Jigar Pancholi
*Attorney, Agent, or Firm*—Conley, Rose & Tayon, PC; B. Noel Kivlin

[57] ABSTRACT

A power management unit is provided that includes a plurality of configuration registers for storing configuration information to set various operational parameters of the power management unit. A program register is mapped within the configuration space of the computer system and is utilized to store a value which sets the I/O address of the index register. The program register is written during the initialization of the power management unit, and may be associated with a predetermined default value. Once the program register has been set with a value indicating the I/O address of the index register, accesses to the configuration registers are achieved by first writing an offset value to the index register. Subsequently, configuration data may be written into or read out of a designated configuration register by executing an appropriate cycle to the address of the configuration data register, which may be mapped one word location beyond that of the index register. As a result of the programmable index register, the addresses of the index register and the configuration data register within the I/O space of the computer system may be specified via software, thus allowing the system designer greater flexibility with respect to the selection of other peripheral devices incorporated within the computer system.

18 Claims, 2 Drawing Sheets

POWER MANAGEMENT UNIT INCLUDING A PROGRAMMABLE INDEX REGISTER FOR ACCESSING CONFIGURATION REGISTERS

BACKGROUND OF THE INVENTION

1. Field of the Invention

This invnention relates to computer systems and more particularly to power management units including internal configuration registers.

2. Description of the Relevant Art

Peripheral devices within computer systems typically include a plurality of so-called "configuration" registers. The configuration registers within a particular peripheral device are provided to store configuration data that controls user programmable operating parameters of the device. For example, configuration registers may be utilized within DMA (direct memory access) controllers to control the direction of a pending data transfer (i.e., memory-to-I/O or I/O-to-memory), the number of bytes to be transferred, and so on. Similarly, configuration registers may be utilized within timers to set programmable time periods and within interrupt controllers to set the priority and/or masking of various interrupt sources, among other things.

The configuration registers of a particular peripheral device are typically accessed by the host processor by first writing an offset value to an index register having a predetermined address within the I/O space. The offset value designates the particular configuration register being written or read. For example, an offset value comprised of 8-bits may be used to select any one of up to 256 different configuration registers. To actually write configuration data into the designated configuration register (pointed to by the off-set value of the index register), an I/O write cycle is executed to an address location referred to as the "configuration data register" location which is typically one word location beyond that of the index register. This causes the physical configuration register pointed to by the offset value of the index register to be written. Read operations to a designated configuration register are accomplished in a similar manner. By employing such an indexing technique, a plurality of configuration registers within the peripheral device may be selectively written or read while occupying, for example, only two word locations within the I/O addressable space of the computer system.

Power management units typically employ a plurality of configuration registers to control power management modes, time-out values, and the like. Within a typical system, the configuration registers of the power management unit are accessed by employing an indexing scheme similar to that described above. A problem results, however, if the index register address and the corresponding configuration data register address have I/O address values that conflict with the I/O mapping of other peripheral devices desired for employment within the computer system. If such a situation arises, either the power management unit or the conflicting peripheral device must be removed from the system. This limits the overall flexibility of the computer system.

SUMMARY OF THE INVENTION

The problems outlined above are in large part solved by a power management unit including a programmable index register for accessing configuration registers in accordance with the present invention. In one embodiment, a power management unit includes a plurality of configuration registers for storing configuration information to set various operational parameters of the power management unit, such as clock control and power control parameters. A program register is mapped within the configuration space of the computer system and is utilized to store a value which sets the I/O address of the index register. The program register is written during the initialization of the power management unit, and may be associated with a predetermined default value. Once the program register has been set with a value indicating the I/O address of the index register, accesses to the configuration registers are achieved by first writing an offset value to the index register. Subsequently, configuration data may be written into or read out of a designated configuration register by executing an appropriate cycle to the address of the configuration data register, which may be mapped one word location beyond that of the index register. As a result of the programmable index register, the addresses of the index register and the configuration data register within the I/O space of the computer system may be specified via software, thus allowing the system designer greater flexibility with respect to the selection of other peripheral devices incorporated within the computer system.

Broadly speaking, the present invention contemplates a power management unit for a computer system comprising a plurality of configuration registers capable of storing configuration information for setting a mode of operation of the power management unit. The power management unit further comprises an index decoder coupled to each of the configuration registers for enabling one of the configuration registers, and an index register coupled to the index decoder and capable of storing an index value that controls which of the configuration registers is enabled by the index decoder. The power management unit finally comprises a program register capable of storing a value that sets an address location of the index register, and a control unit coupled to the program register and to the index register. The control unit is capable of causing an index value to be latched within the index register in response to a write cycle to the address location of the index register.

The present invention further contemplates a computer system comprising a processing unit, a system bus coupled to the processing unit, and a power management unit coupled to the system bus. The power management unit includes a plurality of configuration registers capable of storing configuration information for setting a mode of operation of the power management unit, an index decoder coupled to each of the configuration registers for enabling one of the configuration registers, and an index register coupled to the index decoder and capable of storing an index value that controls which of the configuration registers is enabled by the index decoder. The power management unit additionally includes a program register capable of storing a value that sets an address location of the index register, and a control unit coupled to the program register and to the index register. The control unit is capable of causing an index value to be latched within the index register in response to a write cycle to the address location of the index register.

The present invention finally contemplates a method for accessing a plurality of configuration registers within a power management unit of a computer system comprising the steps of storing a value within a program register that sets an address location of an index register, storing an index value within the index register by executing a write cycle to the address location of the index register, and enabling one of the plurality of configuration registers according to the index value. The method comprises the final step of writing configuration data into the one of the plurality of configuration registers.

BRIEF DESCRIPTION OF THE DRAWINGS

Other objects and advantages of the invention will become apparent upon reading the following detailed description and upon reference to the accompanying drawings in which.

Figure 1:
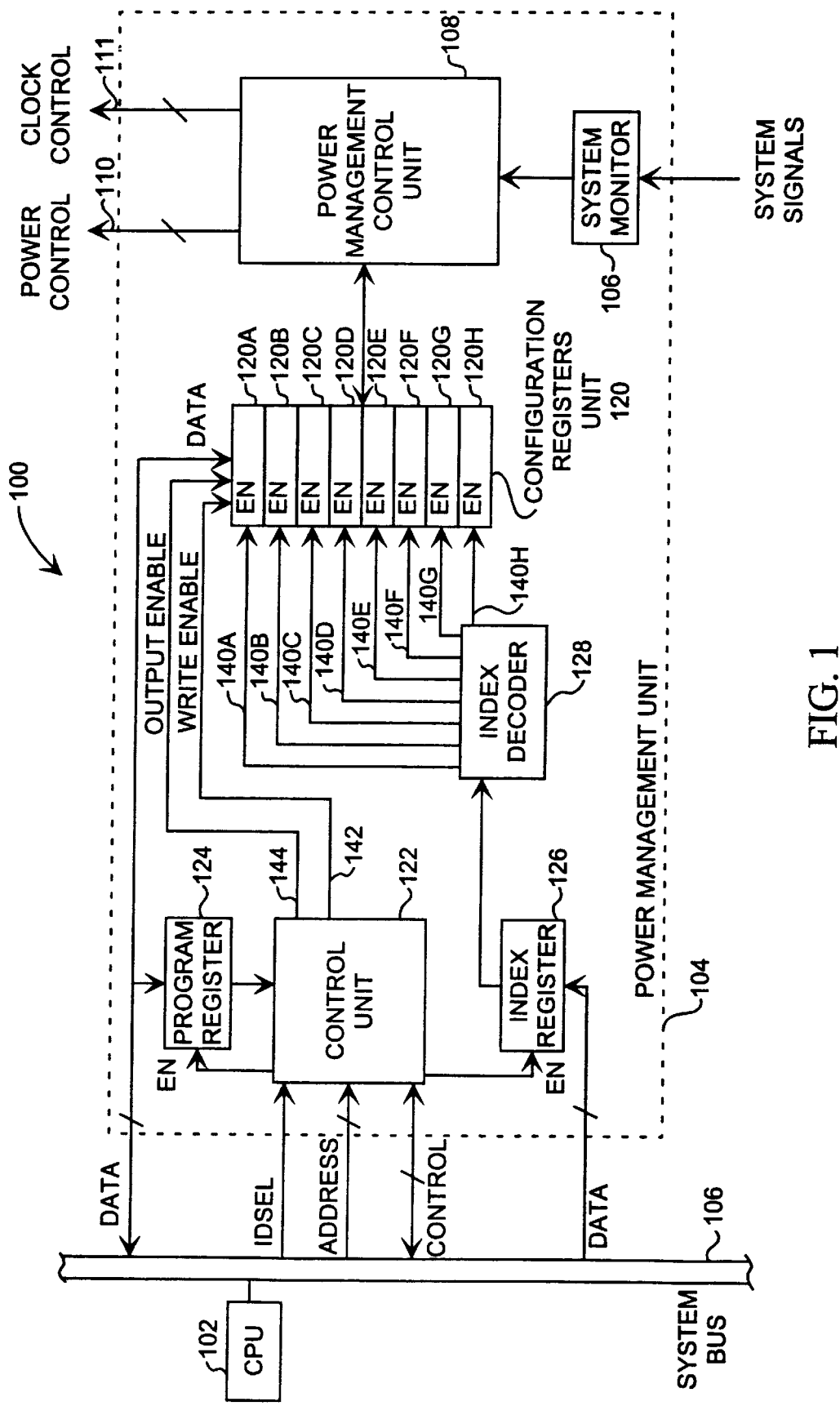
FIG. 1 is a block diagram of a computer system employing a power management unit including a programmable index register for accessing configuration registers in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system 100 including a microprocessor (CPU) 102 coupled to a power management unit 104 via a system bus 106. Microprocessor 102 is a data processing unit that implements a predetermined instruction set. Exemplary processing units include the models 80386 and 80486 microprocessors, among others. System bus 106 is illustrative of, for example, a PCI local bus. It is understood, however, that other bus standards such as the ISA or EISA bus standards could be alternatively employed.

Generally speaking, power management unit 104 is provided for managing the power within computer system 100. Power management unit 104 includes a system monitor 106 capable of monitoring a variety of system activities such as keyboard activities, bus activities, and interrupt activities. A power management control unit 108 is coupled to system monitor 106 and generates a set of power control and clock control signals at lines 110 and 111. The clock control signals control the generation and frequencies of, for example, a CPU clock signal and a system clock signal. The power control signals are utilized to control the application of power to various peripheral devices (not shown). Exemplary implementations of system monitor 106 and power management control unit 108 are described within, for example, U.S. Pat. No. 5,167,024 to Smith, et al. and within the co-pending, commonly assigned patent application entitled "Power Management Architecture Including A Power Mangement Messeging Bus for Conveying An Encoded Activty Signal for Optimal Flexibility" by Gephardt, et al., U.S. Ser. No. 08/223,984, now U.S. Pat. No. 5,493,684 filed concurrently herewith. These documents are incorporated herein by reference in their entirety.

Power management unit 104 further includes a configuration registers unit 120 coupled to power management control unit 108, and a control unit 122 coupled to system bus 106. A program register 124 and an index register 126 are further coupled to system bus 106. An index decoder 128 is finally shown coupled to configuration registers unit 120

Configuration registers unit 120 comprises a plurality of configuration registers 120A–120H for storing configuration information that controls the operation of power management control unit 108. It is noted that certain ones of the configuration registers 120A–120H may further be used to store information indicative of the status of power management control unit 108. For example, the configuration registers 120A–120H may be written with configuration information that controls the response of power management control unit 108 to selected system activities as detected by system monitor 106. The configuration information may further control which peripheral devices (not shown) are powered down during a particular power management mode, and may control the frequencies of selected clock signals during a particular management mode. The configuration information may also control certain time-out values associated with the power management control unit 108, such as a time-out value that controls the entrance of a power reduction mode when no system activities are detected. The configuration registers may finally store status information such as, for example, the current mode of power management control unit 108.

Program register 124 is mapped at a predetermined location within the configuration space of computer system 100 and is provided to store a parameter that sets the address value of index register 126 within the I/O space of computer system 100. During initialization of computer system 100, the system programmer may write a desired address value for index register 126 into program register 124. This is accomplished by executing a write cycle to the predetermined address of the configuration space to which program register 124 is mapped. As a result of such a cycle, the IDSEL signal to power management unit 104 is driven on system bus 106 along with the corresponding address and control signals. Control unit 122 responsively provides a latching enable signal to program register 124 that causes the index address value on the data lines of system bus 106 to be latched within program register 124.

Index register 126 is provided for storing an index value which controls the particular configuration register 120–120H to which index decoder 128 points. The index register 126 may be written with an index value by executing an I/O write cycle to the address location as specified by the value within program register 124. In response to such an I/O write cycle, control unit 122 provides a latching enable signal to the index register 126 which causes the index value driven on data lines of system bus 106 to be latched within index register 126. Index decoder 128 is a decoding circuit that decodes the index value of index register 128 and accordingly asserts an enable signal at one of the lines 140–140H coupled to separate enable inputs of configuration registers 120–120H. Once a desired index value has been stored within the index register 126, the particular configuration register 120–120H pointed to by index decoder 128 (i.e., the enabled configuration register) may be written with configuration data by executing an I/O write cycle to an address location one word beyond that of the address of index register 126. In response to such an I/O write cycle, control unit 122 asserts a write enable signal at line 142 which causes the configuration data from system bus 106 to be stored within the designated configuration register 120–120H. Similar I/O read cycles may be executed to cause control unit 122 to enable (via line 144) the output of a designated configuration register unit 120–120H to thereby read the status of the configuration register.

Figure 2:
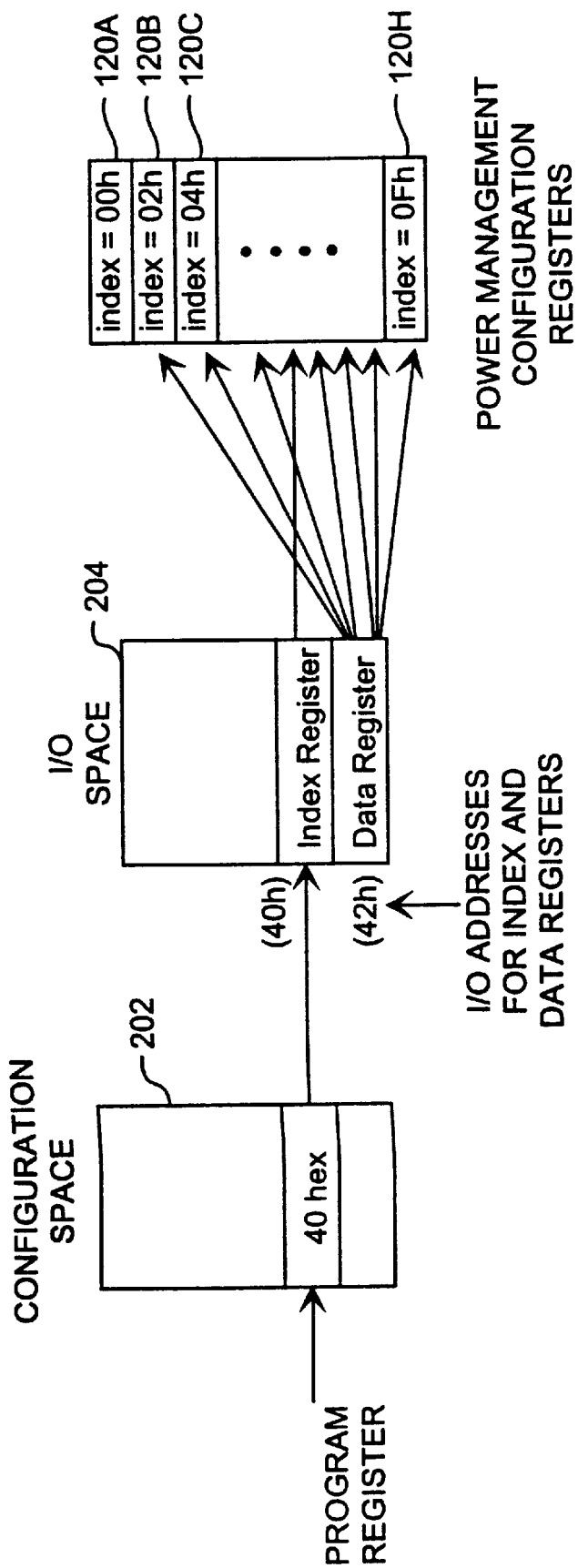
FIG. 2 is a diagram illustrating the configuration and I/O space of a computer system employing a power management unit according to the present invention.

FIG. 2 is a diagram that illustrates a portion of the configuration space 202 and I/O space 204 of computer system 100. As illustrated within the figure, program register 124 is mapped to a predetermined location within the configuration space of computer system 100. In the illustrated example, a value of 40 hexadecimal is stored within program register 124. Thus, this sets the I/O address of index register 126, along with the corresponding address of the configuration data register. That is, accesses to index register 126 must be made to the I/O address of 40h, while accesses to the configuration data register must be made to the I/O address of 42h. Once the value 40h is stored within program register 124, an I/O write cycle to the I/O location of 40h results in the storage of an index value within index register 126. A subsequent I/O write cycle to the address location 42h may then be executed to write configuration data to the particular configuration register 120–120H pointed to by the index value. Status information may be read from configuration registers 120–120H in a similar manner. By providing program register 124, the address of the index register 126 and the corresponding configuration data register (which in this embodiment is always one word location beyond the specified address of the index register) may be programmed by the user, thus allowing the system programmer to avoid conflicts with other I/O peripheral devices which occupy predetermined I/O address locations.

It is noted that while the "configuration data register" address as mapped within the computer system 100 is located one word location beyond that of the programmed address of index register 126, the configuration data register location could be provided at any offset relative to the index register. Furthermore, although program register 124 is mapped within the configuration space of computer system 100, it is possible to map program register 124 within the memory or I/O space of computer system 100.

It is additionally noted that computer aided design tools may be employed to reduce control unit 122 to a sequential logic circuit. Exemplary computer-aided design tools include the behavioral language Verilog as well as the VHSIC hardware description language.

Numerous variations and modifications will become apparent to those skilled in the art once the above disclosure is fully appreciated. For example, it is understood that any number of configuration registers could be provided within the power management unit. It is intended that the following claims be interpreted to embrace all such variations and modifications.

What is claimed is:

1. A power management unit for a computer system comprising:
   a plurality of configuration registers configured to store configuration information for setting a mode of operation of said power management unit;
   an index decoder coupled to each of said plurality of configuration registers and configured to enable a selected one of said plurality of configuration registers;
   an index register coupled to said index decoder and configured to store an index value that controls which of said plurality of configuration registers is enabled by said index decoder;
   a program register configured to store a value that sets an address location of said index register; and
   a control unit coupled to said program register and to said index register, wherein said control unit is configured to cause said index value to be latched within said index register in response to a write cycle to said address location of said index register.

2. The power management unit as recited in claim 1 wherein said program register is mapped within a configuration space of said computer system.

3. The power management unit as recited in claim 1 wherein said index register is mapped within an I/O space of said computer system.

4. The power management unit as recited in claim 1 wherein said control unit is further capable of causing configuration data to be latched within said one of said plurality of configuration registers in response to a write cycle to a configuration data register location.

5. The power management unit as recited in claim 1 further comprising a power management control unit coupled to said plurality of configuration registers, wherein said power management control unit includes a plurality of clock control lines for controlling frequencies of a system clock signal and a CPU clock signal.

6. The power management unit as recited in claim 5 further comprising a system monitor coupled to said power management control unit, wherein said system monitor is configured to detect an occurrence of a selected system activity.

7. The power management unit as recited in claim 1 wherein said control unit is further capable of asserting a latching enable signal to said program register.

8. A computer system comprising:
   a processing unit;
   a system bus coupled to said processing unit; and
   a power management unit coupled to said system bus, wherein said power management unit includes:
      a plurality of configuration registers configured to store configuration information for setting a mode of operation of said power management unit;
      an index decoder coupled to each of said plurality of configuration registers for enabling and configured to enable a selected one of said plurality of configuration registers;
      an index register coupled to said index decoder and configured to store an index value that controls which of said plurality of configuration registers is enabled by said index decoder;
      a program register configured to store a value that sets an address location of said index register; and
      a control unit coupled to said program register and to said index register, wherein said control unit is configured to cause said index value to be latched within said index register in response to a write cycle to said address location of said index register.

9. The computer system as recited in claim 8 wherein said program register is mapped within a configuration space of said computer system.

10. The computer system as recited in claim 8 wherein said index register is mapped within an I/O space of said computer system.

11. The computer system as recited in claim 8 wherein said control unit is further capable of causing configuration data to be latched within said one of said plurality of configuration registers in response to a write cycle to a configuration data register location.

12. The computer system as recited in claim 8 wherein said power management unit further comprises a power management control unit coupled to said plurality of configuration registers, wherein said power management control unit includes a plurality of clock control lines for controlling the frequencies of a system clock signal and a CPU clock signal.

13. The computer system as recited in claim 12 wherein said power management unit further comprises a system monitor coupled to said power management control unit, wherein said system monitor is configured to detect an occurrence of a selected system activity.

14. The computer system as recited in claim 8 wherein said control unit is further capable of asserting a latching enable signal to said program register.

15. A method for accessing a plurality of configuration registers within a power management unit of a computer system comprising the steps of:

storing a value within a program register that sets an address location of an index register;

storing an index value within said index register by executing a write cycle to said address location of said index register;

enabling a selected one of said plurality of configuration registers according to said index value; and writing configuration data into said selected one of said plurality of configuration registers.

16. The method for accessing a plurality of configuration registers within a power management unit as recited in claim 15 wherein said step of storing a value within said program register includes the step of executing a write cycle within a configuration address space of said computer system.

17. The method for accessing a plurality of configuration registers within a power management unit as recited in claim 16 wherein said step of storing an index value within said index register includes the step of executing a write cycle within an I/O address space of said computer system.

18. The power management unit as recited in claim 1 wherein said index value selects one of said plurality of configuration registers to be accessible through software during a given time, and wherein a remainder of said plurality of configuration registers are not accessible through software during said given time.

\* \* \* \* \*